R. CONARROE.
Wire-Band Cutter.

No. 215,100. Patented May 6, 1879.

Attest.
Thos. S. Bowman
Saml. J. Boyd

Inventor.
Robert Conarroe
by Chas. D. Moody
atty.

UNITED STATES PATENT OFFICE.

ROBERT CONARROE, OF BELLEVILLE, ILLINOIS, ASSIGNOR OF ONE-HALF HIS RIGHT TO CHARLES A. MONK, OF SAME PLACE.

IMPROVEMENT IN WIRE-BAND CUTTERS.

Specification forming part of Letters Patent No. 215,100, dated May 6, 1879; application filed March 14, 1879.

*To all whom it may concern:*

Be it known that I, ROBERT CONARROE, of Belleville, Illinois, have invented a new and useful Wire-Band Cutter, of which the following is a full, clear, and exact description, reference being had to the annexed drawings, making part of this specification, in which—

Figure 1:
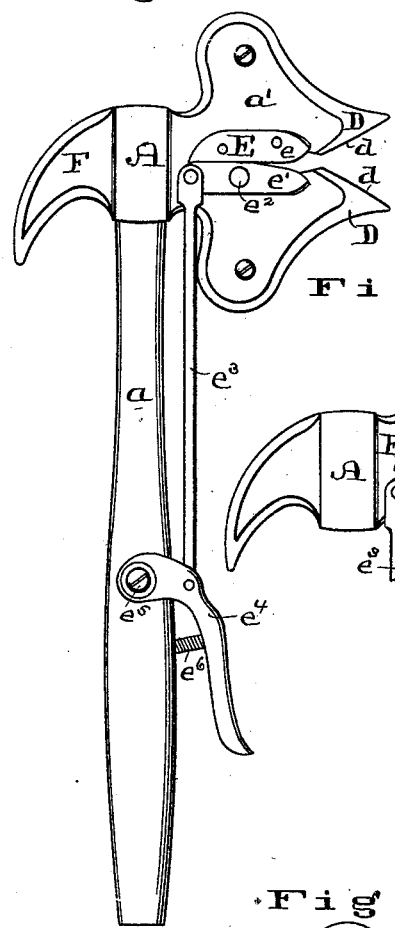
Figure 2:
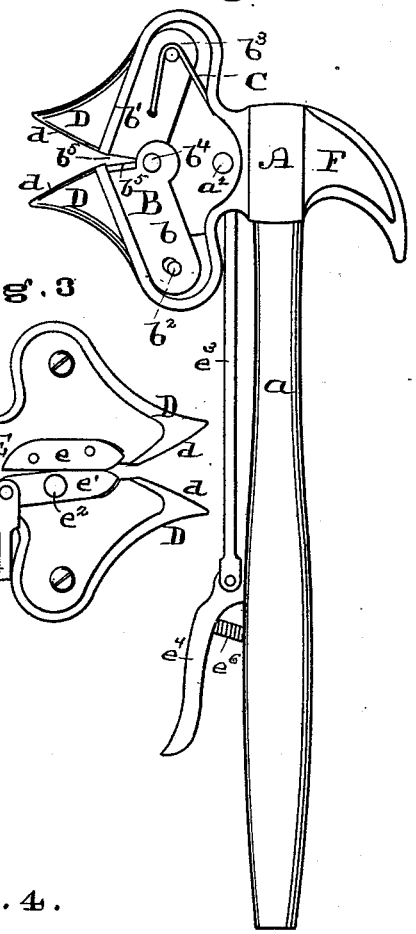
Figure 3:
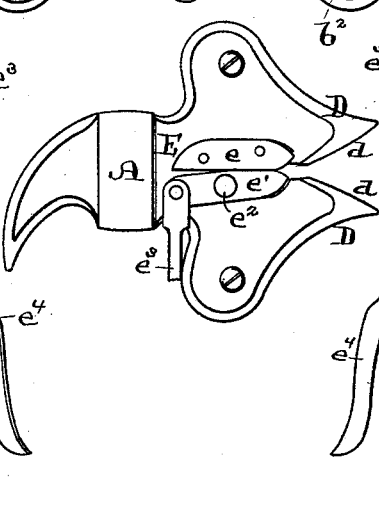

Figure 1 is a side elevation of the invention; Fig. 2, an elevation of the opposite side, one of the outside plates of the head being removed, and showing the blades of the cutter opened; Fig. 3, an elevation of the side of the head shown in Fig. 1, but showing the nippers closed; and Fig. 4, the same view of the head shown in Fig. 2, the cutter-blades being closed.

The same letters denote the same parts.

The present invention in its operation is manipulated like an ordinary hatchet—that is, to sever the wire the implement is grasped by the handle, and is struck sharply down, bringing the cutting mechanism against the wire, the movement creating sufficient momentum to cause the blades of the cutter to close upon and cut the wire.

The invention consists, mainly, of a head attached to a suitable handle, and provided with a pair of blades, which are pivoted to the head, and which remain open until brought against the wire, such contact closing them to reopen again as soon as the cut is made. It also has reference to the means for guiding the wire between the blades. It further has relation to the means for nipping the wire.

The invention is especially adapted to cutting the wire bands with which grain, since the introduction of what are termed "wire binders," is extensively bound. It is useful, however, in cutting wire in other positions where it can be held so as to receive the necessary blow.

Referring to the drawings, A represents the head of the implement. It is shown attached to a handle, $a$. B represents the cutting mechanism, consisting of a pair of blades, $b\ b^1$, which are pivoted to the head A at the points $b^2\ b^3$, respectively, and which are preferably jointed together at $b^4$. The blades may be inclosed in the head by means of the plate $a^1$.

A spring, C, saving when its action is overcome in striking the wire, serves to open the blades apart, as shown in Fig. 2. The head A is preferably furnished with the points D D, which flare apart, as shown, their office being to guide the wire, as the blow is made, between the edges $b^5$ of the blades. To this end it is desirable that the edges $d\ d$ of the points be in line with the edges $b^5$ of the blades when the latter are opened.

Figure 4:
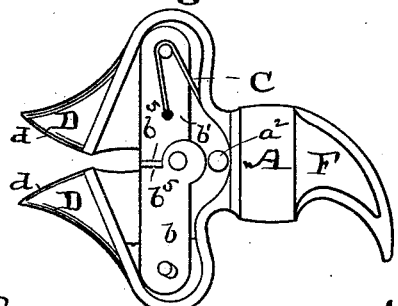

As the blow is made, the wire passes between the points D D and edges $b^5\ b^5$. The movement presses the wire up into the space between the edges $b^5\ b^5$, causing the blades to turn on the pivots $b^2\ b^3$, and to be forced back against a stop, $a^2$, and in so doing to close and cut the wire. This position is shown in Fig. 4. One of the perforations of the blades, say at $b^2$, is elongated to provide for the necessary shortening of the blades as they close. Provision for this shortening and lengthening as the blades are moved may be made at either of the other joints, $b^3\ b^4$. As soon as the wire is cut the blades, by means of the spring, are reopened, when the operation can be repeated.

E represents a nipper attachment, by means of which an end of the cut wire can be readily caught, enabling the wire, after being cut, to be held and drawn by the implement and detached from the gavel. It consists of a pair of jaws, $e\ e^1$, attached to the implement in line with the edges $b^5\ b^5$ of the blades, one of the jaws, $e$, being rigidly attached, and the other jaw, $e^1$, being pivoted at $e^2$, and having a connecting-rod, $e^3$, leading to a lever, $e^4$, that in turn is pivoted to the handle at $e^5$. A spring, $e^6$, serves, saving when the lever is depressed by the operator, to lift the lever and keep the jaws $e\ e^1$ open.

As the blow to cut the wire is made the lever $e^4$ is drawn, but not so strongly but that the wire can easily be forced between the jaws $e\ e^1$. As the wire is cut, the end on that side of the blades remains held in the jaws $e\ e^1$. This enables the wire to be held after the cutting, so that it can be easily disentangled from the gavel. As soon as the lever is released, the wire drops out of the jaws.

The implement is further provided with a hook, F, which is useful in drawing the bundles into position for the bands to be cut.

While it is desirable that the points D D be separated from the blades $b\ b^1$, as shown, it is practicable to extend the blades, and make the points D D in one piece with them, respectively.

The head A also may be attached to any movable part instead of the handle $a$, and the blades may be made sufficiently heavy and be pivoted loosely enough to open without using the spring C.

I claim—

1. The combination of the head A and the blades $b\ b^1$, the latter being pivoted to the former, substantially as described, and as and for the purpose set forth.

2. The combination of the head A and blades $b\ b^1$, the latter being pivoted to the head, and also jointed together, substantially as described, and as and for the purpose set forth.

3. The combination of the head A, blades $b\ b^1$, and spring C, substantially as described, and as and for the purpose set forth.

4. The combination of the head A, blades $b\ b^1$, and points D D, substantially as described, and as and for the purpose set forth.

5. In combination with the head A, having the blades $b\ b^1$, the nippers $e\ e^1$, substantially as described, and as and for the purpose set forth.

6. In combination with the head A, having the blades $b\ b^1$ and handle $a$, the nippers $e\ e^1$, rod $e^3$, lever $e^4$, and spring $e^6$, substantially as described, and as and for the purpose set forth.

7. The combination of the head A, handle $a$, cutting mechanism $b\ b^1$, and the points D D, substantially as described, and for the purpose shown.

Witness my hand.

ROBERT CONARROE.

Witnesses:
 CHAS. D. MOODY,
 CHAS. E. WELLER.